(12) United States Patent
Fujita (10) Patent No.: US 10,167,838 B2
(45) Date of Patent: Jan. 1, 2019

(54) ENGINE CONTROL APPARATUS

(71) Applicant: DENSO CORPORATION, Kariya, Aichi-pref. (JP)

(72) Inventor: Tatsuya Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 2 days.

(21) Appl. No.: 15/275,913

(22) Filed: Sep. 26, 2016

(65) Prior Publication Data

US 2017/0089315 A1 Mar. 30, 2017

(30) Foreign Application Priority Data

Sep. 29, 2015 (JP) ................................. 2015-191491

(51) Int. Cl.
*F02N 11/08* (2006.01)
*F02D 13/02* (2006.01)
(Continued)

(52) U.S. Cl.
CPC ............ *F02N 11/0848* (2013.01); *F02D 9/02* (2013.01); *F02D 13/0234* (2013.01); *F02D 41/0002* (2013.01); *F02D 41/062* (2013.01); *F02N 11/0851* (2013.01); *F02N 19/004* (2013.01); *F02D 2041/001* (2013.01);
(Continued)

(58) Field of Classification Search
CPC .. F02N 11/08; F02N 11/0848; F02N 11/0851; F02N 11/087; F02N 11/106; F02N 15/067; F02N 19/004; F02N 2200/02; F02N 2200/022; F02D 9/02; F02D 13/0234; F02D 41/00; F02D 41/0002; F02D 41/062; F02D 2041/001; Y02T 10/18; Y02T 10/42

USPC .............. 123/179.1, 179.12, 179.14, 179.19, 123/179.22; 701/111, 114
See application file for complete search history.

(56) References Cited

U.S. PATENT DOCUMENTS 4,490,620 A * 12/1984 Hansen ................ F02N 11/0848
123/179.3
4,706,634 A * 11/1987 Nishikawa ............ F02D 41/187
123/480

(Continued)

FOREIGN PATENT DOCUMENTS

| JP | 2002-188549 A | 7/2002 |
| JP | 2003-083211 A | 3/2003 |
| JP | 2008-280996 A | 11/2008 |

*Primary Examiner* — John Kwon
*Assistant Examiner* — Johnny H Hoang
(74) *Attorney, Agent, or Firm* — Oliff PLC (57) ABSTRACT

An engine control apparatus is used with a system equipped with an engine and an engine starter. The engine starter includes an electrical motor, a pinion gear driven by the electrical motor, and a pinion shifter which thrusts the pinion to a location where the pinion is engageable with a ring gear coupled to the engine. The engine control apparatus determines a pulsation parameter which represents a pulsating component of speed of the engine or a value correlating with the pulsating component. The engine control apparatus works to thrust the pinion through the pinion shifter to establish engagement with the ring gear and then rotate the electrical motor to crank the engine. The engine control apparatus alters a cranking terminating time as a function of the pulsation parameter. This minimizes mechanical noise occurring between the pinion gear and the ring gear at the start of the engine.

8 Claims, 8 Drawing Sheets

(51) Int. Cl.
  *F02D 9/02*    (2006.01)
  *F02D 41/06*   (2006.01)
  *F02N 19/00*   (2010.01)
  *F02D 41/00*   (2006.01)
  *F02N 11/10*   (2006.01)
  *F02N 15/06*   (2006.01)

(52) U.S. Cl.
  CPC ........... *F02N 11/087* (2013.01); *F02N 11/106* (2013.01); *F02N 15/067* (2013.01); *F02N 2200/02* (2013.01); *F02N 2200/022* (2013.01); *Y02T 10/18* (2013.01); *Y02T 10/42* (2013.01)

(56) References Cited

U.S. PATENT DOCUMENTS

| | | | | |
|---|---|---|---|---|
| 6,354,257 | B1* | 3/2002 | Marshall | F02N 11/105 123/179.3 |
| 2003/0106515 | A1 | 6/2003 | Kondo | |
| 2006/0157014 | A1 | 7/2006 | Kondo | |
| 2007/0017480 | A1 | 1/2007 | Kondo | |
| 2008/0255752 | A1 | 10/2008 | Sugihara | |
| 2010/0242905 | A1* | 9/2010 | Machida | F02N 11/0844 123/339.14 |
| 2011/0056450 | A1* | 3/2011 | Notani | F02N 11/0855 123/179.4 |
| 2011/0202254 | A1* | 8/2011 | Ishikawa | F02D 17/04 701/103 |
| 2011/0239974 | A1* | 10/2011 | Shoda | F02D 41/0002 123/179.4 |
| 2011/0270512 | A1* | 11/2011 | Hayashi | F02N 11/0844 701/112 |
| 2012/0035827 | A1* | 2/2012 | Kuniyoshi | F02N 11/0855 701/102 |
| 2012/0199090 | A1* | 8/2012 | Kitano | F02N 11/0814 123/179.4 |
| 2013/0166177 | A1 | 6/2013 | Calva et al. | |
| 2013/0231849 | A1 | 9/2013 | Rai et al. | |
| 2015/0096535 | A1* | 4/2015 | Kitano | F02D 41/0097 123/406.53 |
| 2015/0167613 | A1 | 6/2015 | Fujita et al. | |
| 2015/0275837 | A1* | 10/2015 | Fujita | F02N 11/08 123/179.5 |
| 2016/0053736 | A1* | 2/2016 | Matsufuji | F02N 11/0855 701/112 |
| 2016/0305355 | A1* | 10/2016 | Takizawa | F02D 41/0097 |
| 2016/0325731 | A1* | 11/2016 | Yamazaki | B60W 20/15 |

* cited by examiner

FIG.6(c) STARTER

FIG.6(d) CURRENT

ENGINE CONTROL APPARATUS

CROSS REFERENCE TO RELATED DOCUMENT

The present application claims the benefit of priority of Japanese Patent Application No. 2015-191491 filed on Sep. 29, 2015, the disclosure of which is incorporated herein by reference.

BACKGROUND

1 Technical Field

This disclosure relates generally to an engine control apparatus for use in a system equipped with an engine and an engine starter which includes an electric motor and a pinion gear to which torque, as produced by the electric motor, is transmitted for starting the engine.

2 Background Art

For instance, Japanese Patent First Publication No. 2002-188549 teaches an engine control apparatus designed to reduce mechanical noise occurring upon start of an internal combustion engine. The engine control apparatus works to increase the speed of the engine up to a given reference speed and then ignite fuel in the engine to start the engine. The reference speed is fixed to a value higher than a minimum value of a speed range in which the engine is operable stably.

The inventor of this application has faced a drawback in that when the reference speed is fixed, the noise which arises while the speed of a crankshaft of the engine is being elevated by cranking of the engine may increase. There is, therefore, room for improvement in reducing the noise generated when the engine is being started.

SUMMARY

It is therefore an object to provide an engine control apparatus which is designed to reduce mechanical noise occurring upon start of an engine.

According to the first aspect of the invention, there is provided an engine control apparatus for use with a system equipped with an engine and an engine starter. The engine starter includes an electrical motor which is electrically energized to produce torque, a pinion gear to which the torque, as produced by the motor, is transmitted, and a pinion shifter which thrusts the pinion to a location where the pinion is engageable with a ring gear coupled with a crankshaft of the engine. The engine control apparatus comprises a pulsation determiner and a cranking controller. The pulsation determiner works to determine a pulsation parameter which represents one of a pulsating component contained in a rotational speed of the engine and a value correlating with the pulsating component. The cranking controller works to thrust the pinion using the pinion shifter to establish engagement with the ring gear and then rotate the electrical motor to crank the engine. The cranking controller alters a cranking terminating time when a cranking operation of the engine starter to crank the engine is terminated as a function of the pulsation parameter.

Usually, the engine speed contains the pulsating component during the cranking operation. The pulsating component is changed depending upon the amount of gas charged into the cylinder of the engine. The greater the pulsating component of the engine speed, the greater a degree of torque acting the ring gear and the pinion gear will be, which will lead to mechanical noise. Specifically, an increase in the pulsating component will result in an increased degree of force required to compress the gas in the cylinder of the engine as compared with when the pulsating component is small. This causes a great degree of torque to act on a contact between the pinion gear and the ring gear and also may result in relative bouncing of the pinion gear and the ring gear, thereby generating the mechanical noise arising from collision between the ring gear and the pinion gear.

In a high-speed range of the engine, the greater the pulsating component, the greater the mechanical noise will be. Accordingly, when the pulsating component is great, it is preferable that the engine speed is low at the end of the cranking operation.

In order to alleviate the above problem, the engine control apparatus is designed to change or determine the cranking terminating time as a function of the pulsation parameter that is either the pulsating component contained in the engine speed or the value correlating with the pulsating component. This enables the engine speed at a time when the cranking operation is terminated to be lowered with an increase in the pulsation parameter, thereby minimizing the mechanical noise occurring between the ring gear and the pinion gear when starting the engine.

The pulsation parameter, as described above, may be the pulsating component contained in the speed of the engine.

The pulsation parameter may alternatively be the quantity of intake air delivered into a combustion chamber of the engine.

The pulsating component contained in the speed of the engine directly correlates with the quantity of intake air supplied into the combustion chamber. This is because the greater the quantity of intake air, the greater a variation in pressure in the combustion chamber which arises from compression or expansion of the gas in the combustion chamber. The engine control apparatus is capable of determining the cranking terminating time without use of the speed of the engine.

The above system may be equipped with an intake passage connected to the combustion chamber of the engine and an air intake quantity regulator which is operated to regulate a quantity of intake air delivered to the combustion chamber through the intake passage. The engine control apparatus may also include an operating device which operates the air intake quantity regulator to regulate the quantity of intake air during the cranking operation.

The smaller the quantity of intake air during the cranking operation, the smaller the pulsating component contained in the speed of the engine, and the shorter the length of time consumed between the start of the cranking operation and when the pulsation parameter reaches the threshold value. The cranking terminating time may, therefore, be prolonged with a decrease in quantity of intake air to the combustion chamber while keeping the mechanical noise at a lowered level, thereby enabling the speed of the engine to be increased at the end of the cranking operation. This results in a decrease in amount of fuel required to start the engine. To this end, the engine control apparatus may be equipped with the air intake quantity regulator to regulate the quantity of intake air during the cranking operation.

The engine control apparatus may also include a cranking terminating determiner, a termination controller, and a switching determiner. The cranking terminating determiner works to determine whether, after start of the cranking operation, the pulsation parameter increases to be greater than or equal to a given threshold value or not. When the cranking terminating determiner decides that the pulsation parameter is greater than or equal to the given threshold value, the termination controller terminates the cranking operation. The switching determiner decides whether the pulsation parameter has become greater than or equal to a given value or not which is smaller than the given threshold value. The operating device operates the air intake quantity regulator to have the quantity of intake air which is delivered into the combustion chamber in a period of time from start of the cranking operation until the switching determiner decides that the pulsation parameter has become greater than or equal to the given value and which is greater than the quantity of intake air which is delivered into the combustion chamber in a period of time from when the switching determiner decides that the pulsation parameter has become greater than or equal to the given value until the switching determiner decides that the pulsation parameter has become greater than or equal to the threshold value.

The mechanical noise which occurs between the ring gear and the pinion gear and results from the pulsating component of the engine speed usually increases with an increase in the engine speed.

In the first half of the time the engine is started, the speed of the engine is usually low, so that when the quantity of intake air supplied to the combustion chamber is increased in order to quickly start the engine, the above noise is not undesirably high. In contrast, in the second half of the time the engine is started, the speed of the engine is high. It is, thus, preferable to decrease the quantity of intake air delivered to the combustion chamber in order to reduce the mechanical noise.

Based on the above fact, the engine control apparatus defines the given value smaller than the threshold value and works to control the operation of the air intake quantity regulator to have the quantity of intake air which is delivered into the combustion chamber in the period of time from the start of the cranking operation until the switching determiner decides that the pulsation parameter has become greater than or equal to the given value and which is greater than the quantity of intake air which is delivered into the combustion chamber in the period of time from when the switching determiner decides that the pulsation parameter has become greater than or equal to the given value until the switching determiner decides that the pulsation parameter has become greater than or equal to the threshold value. This achieves a quick start of the engine and reduces the mechanical noise occurring between the ring gear and the pinion gear.

The air intake quantity regulator may include at least one of a throttle valve device disposed in the intake passage and a variable valve timing device which works to alter a valve timing of an intake valve disposed in the engine.

The engine control apparatus may also include a sub-determiner which determined whether the pulsation parameter is greater than or equal to a reference value or not after start of the cranking operation. When the pulsation parameter is determined by the sub-determiner to be greater than or equal to the reference value, the cranking controller terminates the cranking operation after an air-fuel mixture is ignited in the combustion chamber of the engine, while when the pulsation parameter is determined by the sub-determiner to be smaller than the reference value, the cranking controller terminates the cranking operation before the air-fuel mixture is ignited in the combustion chamber of the engine.

When the pulsating component contained in the speed of the engine is great, it will cause the speed of the engine immediately after start of the cranking operation to be lowered by the amplitude of the pulsating component. This may result in a lack in the quantity of fuel required to start the engine, which leads to the misfire in the engine. It is, therefore, preferable to terminate the cranking operation after the air-fuel mixture has been ignited in the engine when the pulsating component of the speed of the engine is great.

In order to alleviate the above problem, the engine control apparatus works to terminate the cranking operation after the air-fuel mixture is ignited in the combustion chamber of the engine when the pulsation parameter is determined to be greater than or equal to the reference value, meaning that the pulsating component is great. This eliminates the risk of misfire in the engine and ensures the stability in starting the engine.

Alternatively, when the pulsation parameter is determined to be smaller than the reference value, meaning that the pulsating component is small, the engine control apparatus terminates the cranking operation before the air-fuel mixture is ignited in the combustion chamber of the engine. The reason why the cranking operation may be terminated before the air-fuel mixture is ignited is because when the pulsating component is small, it is easy to calculate the amount of fuel required to start the engine as compared with when the pulsating component is great. The above adjustment of the cranking termination avoids an undesirable increase in fuel required to commence the combustion of the fuel and shortens the time required by the cranking operation.

The engine starter may be designed so that a period of time from when the engine starter starts cranking the engine until the speed of the engine reaches a given speed is less than or equal to a preselected period of time. The given speed is defined to be lower than an idling speed of the engine. The cranking terminating determiner works to determine whether, after start of the cranking operation, the pulsation parameter increases to be greater than or equal to a given threshold value or not. When the cranking terminating determiner decides that the pulsation parameter is greater than or equal to the given threshold value, the termination controller terminates the cranking operation. The given threshold value is set to a minimum value of a range where the pulsation parameter is permitted to change in the preselected period of time after the engine starter starts cranking the engine.

The speed of the engine which is lower than the idling speed of the engine is, as described above, defined as the given speed. The starter is engineered so that the period of time from when the engine starter starts cranking the engine until the speed of the engine reaches the given speed is less than or equal to the preselected period of time.

The given threshold value is set to the minimum value of the range in which the pulsation parameter is permitted to change in the preselected period of time after the engine starter starts cranking the engine. This causes the time the starter cranks the engine to be shortened with an increase in the pulsating component, thereby decreasing the speed of the engine at the termination of the cranking operation.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENT

First Embodiment

The first embodiment in which an engine control apparatus is used with a vehicle, such as an automobile, equipped with a multi-cylinder four-cycle engine (e.g., a four-cylinder four-cycle engine) working as a main power source will be described below with reference to the drawings.

Figure 1:
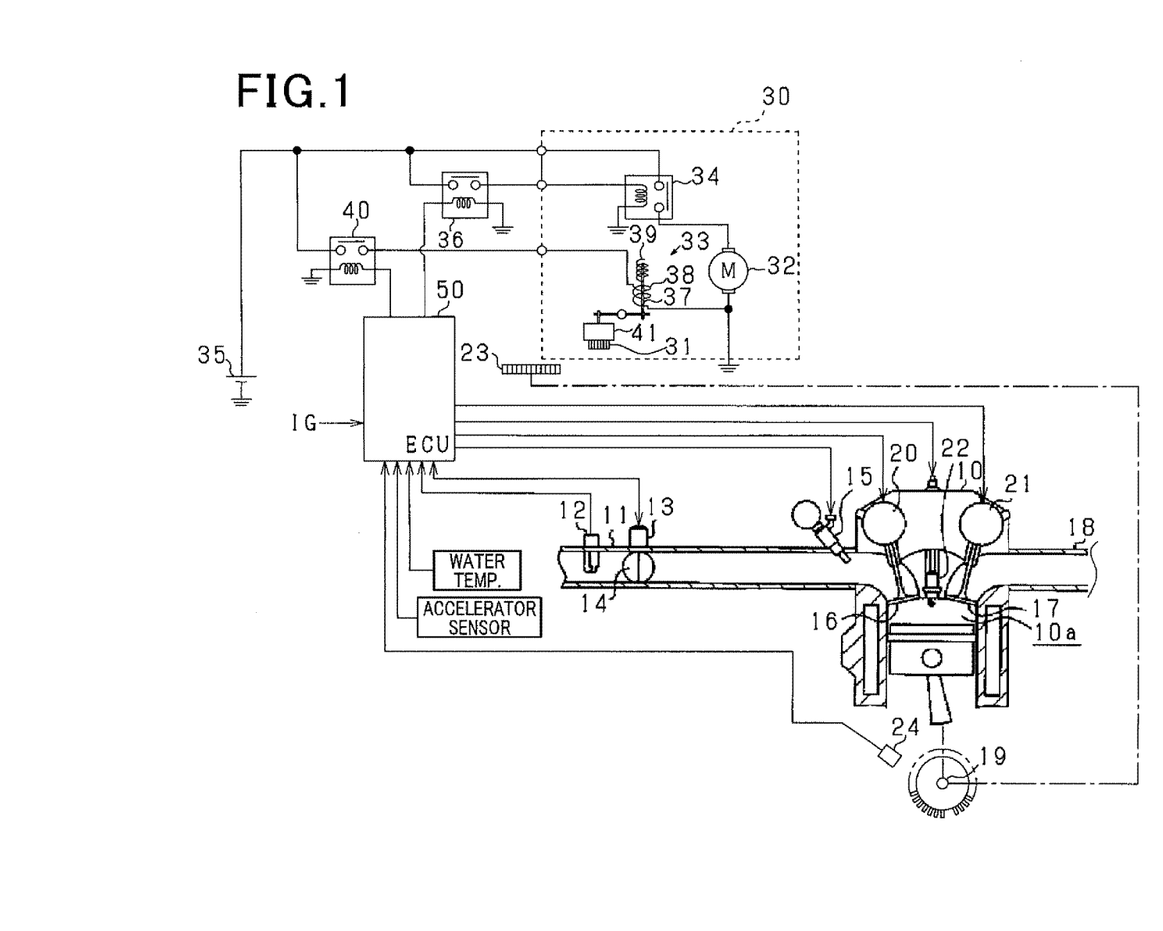
FIG. 1 is a structural view which illustrates an engine control apparatus according to the first embodiment which is used with an automobile equipped with an internal combustion engine and an engine starter.

The vehicle is, as illustrated in FIG. 1, equipped with an engine 10, a starter 30 (which will also be referred to below as an engine starter), and an ECU (Electronic Control Unit) 50 working as the engine control apparatus. The engine 10 in this embodiment is a spark-ignited gasoline internal combustion engine. The engine 10 has an intake passage 11 in which an air flow meter 12 is installed. The air flow meter 12 works as an intake airflow sensor to measure the amount of intake air per unit time. The intake passage 11 has also installed therein a throttle valve 14 which is located downstream of the air flow meter 12 and driven by a throttle actuator 13 to regulate an area of a flow path in the intake passage 11. The throttle actuator 13 is implemented by, for example, a DC motor. The air, as sucked through the throttle valve 14, is delivered to a combustion chamber 10a in each cylinder through an intake port of the engine 10. Each of the intake ports of the engine 10 has installed therein a fuel injector 15 which sprays fuel into the combustion chamber 10a.

The engine 10 has an intake valve 16 installed in each intake port thereof and an exhaust valve installed in each exhaust port thereof. When the intake valve 16 is opened, it will cause the intake air to be sucked into the combustion chamber 10a. When the exhaust valve 17 is opened, it will cause exhaust gas, as produced by combustion of fuel, to be drained into the exhaust passage 18. The rotation of the crankshaft 19 of the engine 10 will cause an intake camshaft and an exhaust camshaft (not shown) to be rotated. The intake valves 16 and the exhaust valves 17 are then reciprocated by cams mounted on the intake camshaft and the exhaust camshaft. The exhaust passage 18 has a catalyst such as a three-way catalytic converter disposed therein to control the exhaust emissions from the engine 10.

The intake valves 16 have mounted thereon a variable valve timing device 20 which works to alter the timing of lifting thereof (which will also be referred to as an opening-closing or valve timing below). Similarly, the exhaust valves 17 have mounted thereon an exhaust valve device 21 which works to alter the opening-closing timing thereof. Specifically, the variable valve timing device 20 alters the phase of relative rotation of the crankshaft 19 to the intake camshaft. The exhaust valve device 21 alters the phase of relative rotation of the crankshaft 19 to the exhaust camshaft. The variable valve timing device 20 and the exhaust valve device 21 are implemented by, for example, a hydraulically actuated variable valve timing mechanism. In this embodiment, at least one of or a combination of the variable valve timing device 20, the throttle actuator 13, and the throttle valve 14 functions as an air intake quantity regulator. A combination of the throttle actuator 13 and the throttle valve 14 will also be referred below to as a throttle valve device.

In this embodiment, the opening-closing timing of the intake valves 16 is adjusted to an angular position on the advance angle side from a given most retarded angle. A degree of such adjustment to the advance angle side is defined as an intake valve advance angle. Specifically, the intake valve advance angle is set to 0° CA in an initial status where the variable valve timing device 20 is not in operation and altered to the advance angle side by the operation of the variable valve timing device 20. For instance, the intake valve advance angle is selected in a range 0° CA (i.e., the most retarded angle) to 40° CA. The opening-closing timing of the exhaust valves 17 is adjusted to an angular position on the retarded angle side from a given most advanced angle. A degree of such adjustment to the retarded angle side is defined as an exhaust valve retarded angle. Specifically, the exhaust valve retarded angle is set to 0° CA in an initial status where the exhaust valve device 21 is not in operation and altered to the retarded angle side by the operation of the exhaust valve device 21. For instance, the exhaust valve retarded angle is selected in a range 0° CA (i.e., the most advanced angle) to 40° CA.

The cylinder head of the engine 10 has mounted therein the spark plugs 22, one for each cylinder. The spark plugs 22 are applied with a high-voltage through an ignition coil, not shown, at a desired ignition timing. The application of such high voltage will create a spark between center and ground electrodes of each of the spark plugs 22 to ignite an air-fuel mixture in the combustion chamber 10a, so that it is combusted. This produces torque on the crankshaft 19 which is, in turn, transmitted to drive wheels, not shown.

The starter 30 serves as a pinion-push type engine starting device and is equipped with a pinion gear 31, an electric motor 32, and an electromagnetic actuator 33. The motor 32 works to rotate the pinion gear 31. The electromagnetic actuator 33 works to thrust the pinion gear 31 in an axial direction thereof. The motor 32 is electrically connected to a battery 35 through a motor energization relay 34. When a switch installed in the motor energization relay 34 is turned on, electric power is supplied from the battery 35 to the motor 32. A motor drive relay 36 is connected to a coil of the motor energization relay 34 and turns on or off the motor energization relay 34 in response to an electrical signal. Specifically, the motor drive relay 36 is responsive to an on-signal to turn on the switch of the motor energization relay 34, so that the power is supplied from the battery 35 to rotate the motor 32.

The electromagnetic actuator 33 includes a plunger 37, a coil 38, and a return spring 39. The plunger 37 transmits drive force to the pinion gear 31 through a lever. When excited, the coil 38 attracts the plunger 37 in an axial direction thereof. The electromagnetic actuator 33 is electrically connected to the battery 35 through a pinion drive relay 40. The pinion drive relay 40 is turned on or off in response to an electrical signal independent from the electrical signal inputted to the motor drive relay 36. In other words, the rotation of the pinion gear 31 driven by the motor 32 and the thrust motion of the pinion gear 31 driven by the electromagnetic actuator 33 are achieved independently from each other. The electromagnetic actuator 33 works as a pinion shifter.

The pinion gear 31 is movable between an engagement position where the pinion gear 31 meshes with the ring gear 23 coupled with the crankshaft 19 and a disengagement position where the pinion gear 31 is in disengagement from the ring gear 23. Specifically, when the coil 38 is in deenergized state, the return spring 39 holds the pinion gear 31 in the disengagement position. When the ECU 50 outputs the on-signal to turn on the pinion drive relay 40, the coil 38 is excited by the power from the battery 35, thereby causing the plunger 37 to be attracted in the axial direction thereof against reactive pressure, as produced by the return spring 39, to thrust the pinion gear 31 toward the ring gear 23. Subsequently, when each of teeth on an outer circumference of the pinion gear 31 enters between a respective adjacent two of teeth on an outer circumference of the ring gear 23, it achieves mechanical engagement between the pinion gear 31 and the ring gear 23. In this engagement, energization of the motor 32 causes the pinion gear 31 to be rotated to rotate the ring gear 23, thereby cranking the engine 10.

Afterwards, when the ECU 50 outputs the off-signal to turn off the pinion drive relay 40, it stops supplying the power from the battery 35 to the coil 38, so that the plunger 37 is moved by restoring force the return spring 39 exerts, thereby causing the pinion gear 31 to leave the ring gear 23.

The torque, as produced by the motor 32, is transmitted the pinion gear 31 through the one-way clutch 41. The one-way clutch 41 works to transmits from the motor 32 to the ring gear 23 only the torque which will be exerted by the pinion gear 31 on the ring gear 23 and runs idle to block transmission of torque which is produced by rotation of the crankshaft 19 and exerted on the pinion gear 31.

A crank angle sensor 24 is disposed near the crankshaft 19 to measure an angular position (which is usually referred to as a crank angle) of the crankshaft 19. Output signals of the crank angle sensor 24 and the air flow meter 12 are inputted to the ECU 50. A signal indicating an open position of the throttle valve 14 and a signal IG indicating an on- or off-state of an ignition switch through which a driver of the vehicle requests to start the engine 10 are also inputted to the ECU 50. The ECU 50 is mainly implemented by a microcomputer made up of a CPU, a ROM, and a RAM and executes control tasks stored in the form of programs in the ROM to perform automatic engine stop and restart control (also called idle stop control) and combustion control for the engine 10. The automatic engine stop and restart control is to automatically stop the engine 10 when a given stop condition is met during operation of the engine 10 and the automatically restart the engine 10 when a given restart condition is met.

Usually, when the starter 30 is cranking the engine 10, the speed of the engine 10 varies and oscillates in a short cycle. Such an oscillating component of the engine speed will also be referred to as a pulsating component in this disclosure. The ECU 50, as described later in detail, works as a pulsation determiner to calculate a pulsation parameter which represents one of the pulsating component contained in the speed of the engine 10 and a value correlating with the pulsating component.

The engine speed that is the rotational speed of the crankshaft 19 contains the pulsating component. Each cylinder of the engine 10 is cyclically subjected to compression and expansion of the combustion chamber 10a. The greater the pulsating component of the engine speed, the greater a pulsating component of rotational speed of the ring gear 23 will be, thereby resulting in an increased degree of torque exerted on the ring gear 23 and the pinion gear 31, which may lead to mechanical noise occurring between the ring gear 23 and the pinion gear 31. Specifically, when the pulsating component increases, it may result in a failure of the pinion gear 31 in following the rotation of the ring gear 23, in other words, relative bounding of engaged teeth of the pinion gear 31 and the ring gear 23 arising from a deviation of the speed of the pinion gear 31 from that of the ring gear 23, thereby generating the mechanical noise arising from collision between the ring gear 23 and the pinion gear 31. In order to reduce such noise, the ECU 50 works as a cranking controller to control a starting operation of the engine 10 so as to decrease the speed of the engine 10 at a final stage of the cranking operation with an increase in quantity of intake air delivered to the combustion chamber 10a. An example which decreases the speed of the engine 10 at the final stage of the cranking operation with an increase in quantity of the intake air will be described below.

Figure 2:
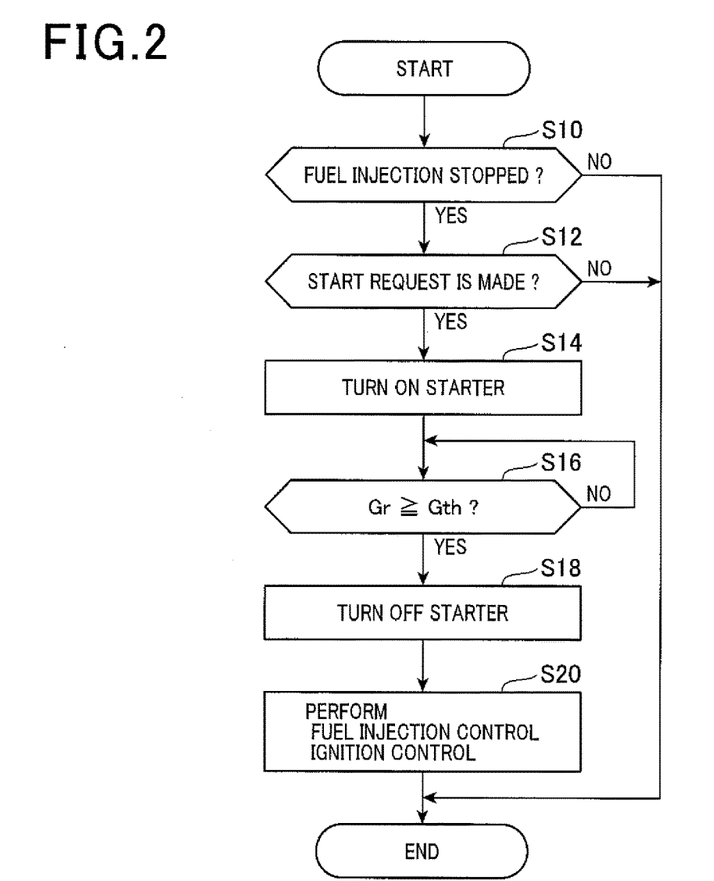
FIG. 2 is a flowchart of a sequence of logical steps in a start control program executed by the engine control apparatus of FIG. 1.

FIG. 2 is a flowchart of a sequence of logical steps in a start control program executed by the ECU 50.

After entering the program, the routine proceeds to step S10 wherein it is determined whether the fuel injector 15 has stopped spraying fuel. If a YES answer is obtained, then the routine proceeds to step S12 wherein it is determined whether a start request to start the engine 10 has been made or not. In this embodiment, the start request is determined to have been made when the driver of the vehicle has turned on the ignition key or when the automatic engine stop and restart control determines that the engine restart condition has been made.

If a YES answer is obtained in step S12 meaning that the start request has been made, then the routine proceeds to step S14 wherein the motor drive relay 36 and the pinion drive relay 40 are turned on to actuate the starter 30, thereby starting cranking the engine 10. In this embodiment, the throttle valve 14 is kept in a preselected open position for a period of time between when the starter 30 starts cranking the engine 10 and when fuel is fired for the first time in the engine 10. The open timing and the closing timing of the intake valves 16 and the exhaust valves 17 are fixed to preselected timings.

The routine proceeds to step S16 wherein it is determined whether the air intake quantity Gr that is the volume of intake air, as measured by the air flow meter 12, has become greater than a given threshold value Gth or not. The determination in step S16 is to determine whether the cranking operation should be terminated or not. The ECU 50 works as a pulsating component determiner and a cranking terminating determiner to execute the operation in step S16.

How to select the threshold value Gth will be described below with reference to FIG. 3.

Figure 3:
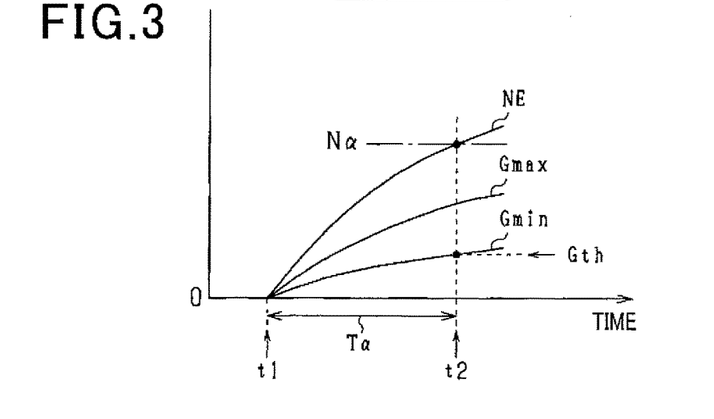
FIG. 3 is a graph which demonstrates how to determine a threshold value for use in terminating a cranking operation in the engine control apparatus of FIG. 1.

FIG. 3 demonstrates transitions in engine speed NE and air intake quantity after the cranking operation is started. The engine speed NE in FIG. 3 is the rotational speed of the engine 10 from which the pulsating component is removed.

In FIG. 3, time t1 is a time when the cranking operation of the starter 30 starts being performed. Time t2 is a time when the engine speed NE reaches a given speed Na (e.g., 450 rpm). A period of time Ta, as illustrated in FIG. 3, from when the starter 30 starts cranking the engine 10 and until the engine speed NE reaches the given speed Na is less than or equal to a given value (e.g., 0.3 sec.) For instance, the period of time Ta is set to a value (e.g. 0.2 sec.) which is shorter than the above given value in an initial status, for example, where the battery 35 is fully charged, and the starter 30 and the battery 35 are not yet aged.

The threshold value Gth is set to a lower limit (i.e., a minimum value) Gmin of a range where the quantity of intake air flowing through the intake passage 11 is permitted to change in the period of time Ta after the starter 30 starts cranking the engine 10. The threshold value Gth is experimentally determined. In FIG. 3, a value Gmax is an upper limit or maximum value of the range where the quantity of intake air flowing through the intake passage 11 is permitted to change in the period of time Ta after the starter 30 starts cranking the engine 10.

The use of the threshold value Gth reduces the mechanical noise generated between the ring gear 23 and the pinion gear 31. Specifically, the mechanical noise which occurs between the ring gear 23 and the pinion gear 31 and results from the pulsating component of the engine speed NE usually increases with an increase in the engine speed NE. The length of time consumed between the start of the cranking operation and when the air intake quantity Gr exceeds the threshold value Gth decreases with an increase in quantity of intake air actually sucked into the engine 10, so that the engine speed NE at the end of the cranking operation is, as demonstrated in FIG. 4, lowered. The time between the start of the cranking operation and when the air intake quantity Gr exceeds the threshold value Gth is, therefore, shortened by increasing the actual quantity of intake, so that the engine speed NE at the end of the cranking operation will decrease, thus resulting in reduction in the above described noise.

Figure 4:
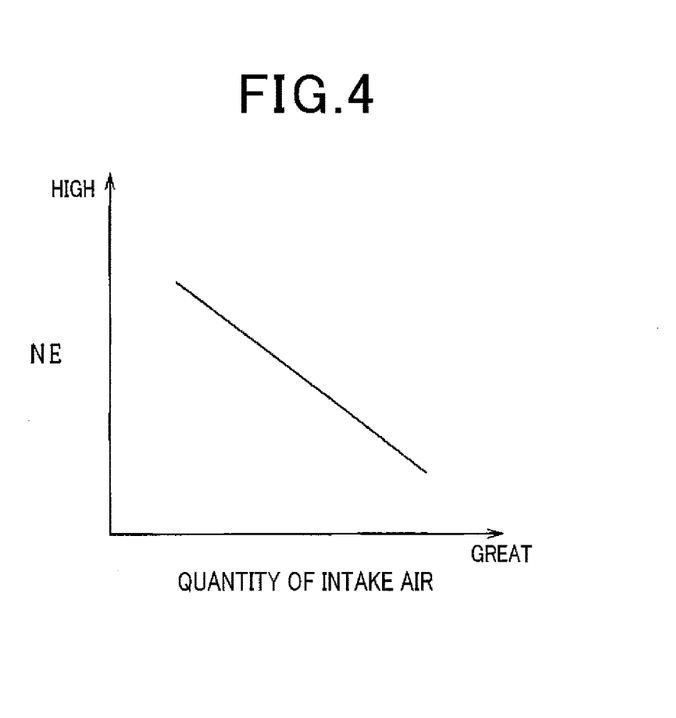
FIG. 4 is a graph which represents a relation between engine speed on termination of a cranking operation and the quantity of intake air delivered to an engine.

A decrease in the pulsating component of the engine speed will result in stability of rotation of the ring gear 23, as achieved by the rotation of the pinion gear 23, which lowers the noise even when the engine speed at the end of the cranking operation increases.

Figure 5:
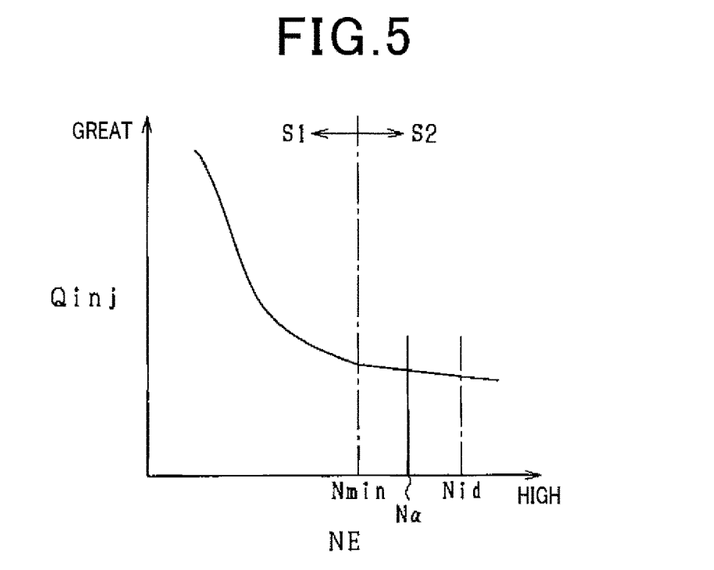
FIG. 5 is a graph which illustrates a fuel increasing range in which it is required to increase the quantity of fuel to be sprayed into an engine and a fuel non-increasing range in which there is no need to increase the quantity of fuel to be sprayed into the engine.

The given speed Na is, as demonstrated in FIG. 5, set to be higher than an intermediate speed Nmin lying at a boundary between a fuel increasing range S1 where it is required to increase the quantity of fuel to be sprayed into the engine 10 at the start of the engine 10 and a fuel non-increasing range S2 where there is no need to increase the quantity of fuel to be sprayed into the engine 10 and also lower than the idling speed Nid of the engine 10. The fuel increasing range S1 and the fuel non-increasing range S2 will be discussed. The engine starting injection quantity Qinj that is the quantity of fuel required to combust the fuel for the first time in the engine 10 is set smaller with an increase in engine speed NE. A quantity by which the engine starting injection quantity Qinj decreases with an increase in engine speed NE in a range higher than the intermediate speed Nmin is set smaller than that by which the engine starting injection quantity Qinj decreases with an increase in engine speed NE in a range lower than the intermediate speed Nmin.

Referring back to FIG. 2, if a YES answer is obtained in step S16, then the routine proceeds to step S18 wherein the motor drive relay 36 and the pinion drive relay 40 are turned off to deactivate the starter 30, thereby terminating the cranking operation. In this embodiment, the ECU 50 works as a termination controller to execute the operation of step S18.

After step S18, the routine proceeds to step S20 wherein the ECU 50 performs fuel injection control and ignition control to spray the fuel through the fuel injectors 15 into the engine 10 and ignite the fuel through the spark plugs 22 in the engine 10.

Figures 6A, 6B, 6C, 6D:
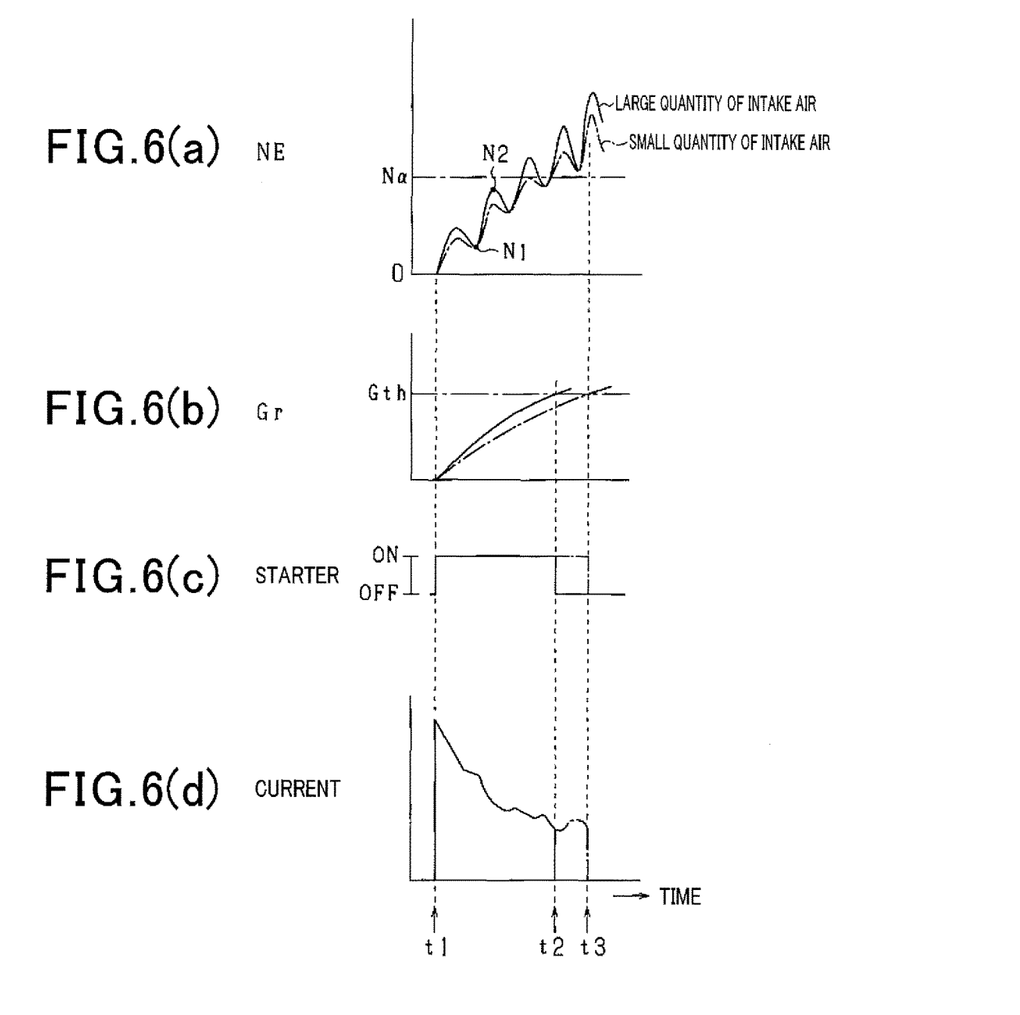
FIG. 6(a) demonstrates a change in engine speed.
FIG. 6(b) represents a change in air intake quantity delivered into an engine.
FIG. 6(c) represents a transition in a status where an engine starter is driven.
FIG. 6(d) represents a change in electrical current flowing through an electrical motor of an engine starter.

FIGS. 6(a) to 6(d) demonstrate an example of engine starting control executed by the ECU 50 to start the engine 10. FIG. 6(a) represents a change in engine speed NE. FIG. 6(b) represents a change in air intake quantity Gr. FIG. 6(c) represents a transition in a status where the starter 30 is driven. FIG. 6(d) represents a change in electrical current flowing through the motor 32. A solid line indicates the case where the quantity of intake air into the engine 10 is greater, while a chain line indicates the case where the quantity of intake air into the engine 10 is smaller.

In the illustrated example, when the quantity of intake air actually sucked into the engine 10 is greater, the air intake quantity Gr gradually increases after start of the cranking operation at time t1. At time t2 when the air intake quantity Gr reaches the threshold value Gth, the cranking operation is terminated.

Alternatively, when the quantity of intake air actually sucked into the engine 10 is smaller, a rate at which the air intake quantity Gr increases after time t1 is, as can be seen in FIG. 6(b), smaller than that when the quantity of intake air is greater. Therefore, at time t3 following time t2, the air intake quantity Gr reaches the threshold value Gth, so that the cranking operation is terminated. The ECU 50, as described above, works as the cranking controller which also includes the cranking terminating determiner serving to determine that a cranking terminating signal should be outputted to the starter 30 earlier with an increase in quantity of intake air sucked into the engine 10. The cranking controller is also equipped with a cranking starting determiner which works to output a cranking starting signal to the starter 30. The cranking terminating determiner decides the time when the air intake quantity Gr after the cranking starting determiner outputs the cranking starting signal to the starter 30 reaches the threshold value Gth as a cranking terminating time when the cranking terminating signal should be outputted to the starter 30. The measurement of the quantity of intake air sucked into the engine 10 is achieved by an intake airflow sensor (i.e., the air flow meter 12) using known techniques.

The above embodiment offers the following beneficial advantages.

The ECU 50 terminates the cranking operation of the starter. 30 when the air intake quantity Gr is determined to have exceeded the threshold value Gth after the start of the cranking operation. This enables the engine speed NE at the end of the cranking operation to be lowered with an increase in pulsating component actually contained in the speed of the engine 10, thereby reducing the noise occurring between the ring gear 23 and the pinion gear 31.

Second Embodiment

The second embodiment will be described below with respect to differences between itself and the first embodiment. The ECU 50 of this embodiment is designed to change, that is, determine the cranking terminating time as a function of the pulsating component contained in the speed of the engine 10 instead of the air intake quantity Gr.

Figure 7:
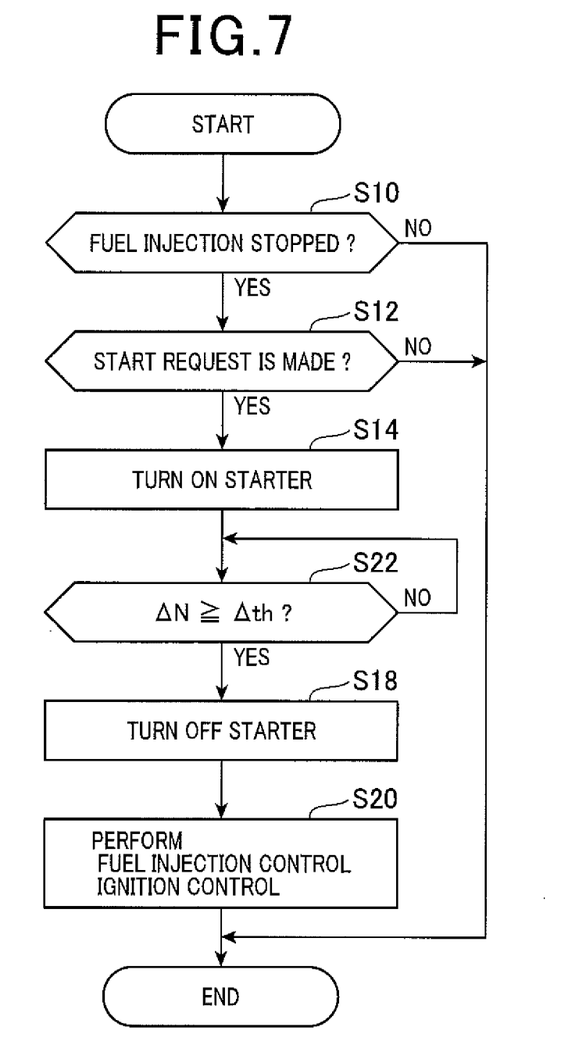
FIG. 7 is a flowchart of a sequence of logical steps in a start control program executed by an engine control apparatus in the second embodiment.

FIG. 7 is a flowchart of a sequence of logical steps in a start control program executed by the ECU 50 in the second embodiment. The same step numbers, as employed in FIG. 2, will refer to the same operations, and explanation thereof in detail will be omitted here.

After step S14 wherein the starter 30 is turned on, the routine proceeds to step S22 wherein an amplitude ΔN of the pulsating component contained in the engine speed NE is calculated. The amplitude ΔN of the pulsating component may be, as can be seen in FIG. 6(a), derived by a difference between a minimum value N1 and a maximum value N2 of the engine speed NE while the engine speed NE is rising after start of the cranking operation. For instance, each time the minimum value N1 and the maximum value N2 of the engine speed NE appear, the amplitude ΔN may be updated. Alternatively, each time the minimum value N1 and the maximum value N2 of the engine speed NE appear, differences between the minimum value N1 and the maximum value N2 which have been already derived may be averaged as a value of the amplitude ΔN. The amplitude ΔN of the pulsating component, as obtained in the above way, gradually increases with the passage of time after start of the cranking operation. The engine speed NE is calculated using an output of the crank angle sensor 24 in a known way.

In step S22, it is determined whether the amplitude ΔN of the pulsating component is greater than or equal to a threshold value Δth or not. The threshold value Δth is experimentally predetermined. The operation in step S22 is to determine whether the cranking operation should be terminated or not. The threshold value Δth is set to a minimum value of a range wherein the amplitude of the pulsating component of the speed of the engine 10 usually varies in the above period of time Ta after the start of the cranking operation. If a YES answer is obtained in step S22 meaning that the amplitude ΔN is greater than or equal to the threshold value Δth, then the routine proceeds to step S18.

The second embodiment is also capable of reducing the above noise at the start of the engine 10. Usually, it is difficult to accurately determine the quantity of intake air into the engine 10 when the pulsating component of the speed of the engine 10 is great. This embodiment is useful for such a case because of use of the amplitude ΔN of the pulsating component and effective in precisely deriving the pulsating component of the speed of the engine 10 to determine the cranking terminating time.

Third Embodiment

The third embodiment will be described below with respect to differences between itself and the first embodiment. The ECU 50 of this embodiment is designed to deactivate the starter 30 to terminate the cranking operation after the air-fuel mixture has been ignited in the combustion chamber 10a when the pulsating component contained in the speed of the engine 10 is great.

Figure 8:
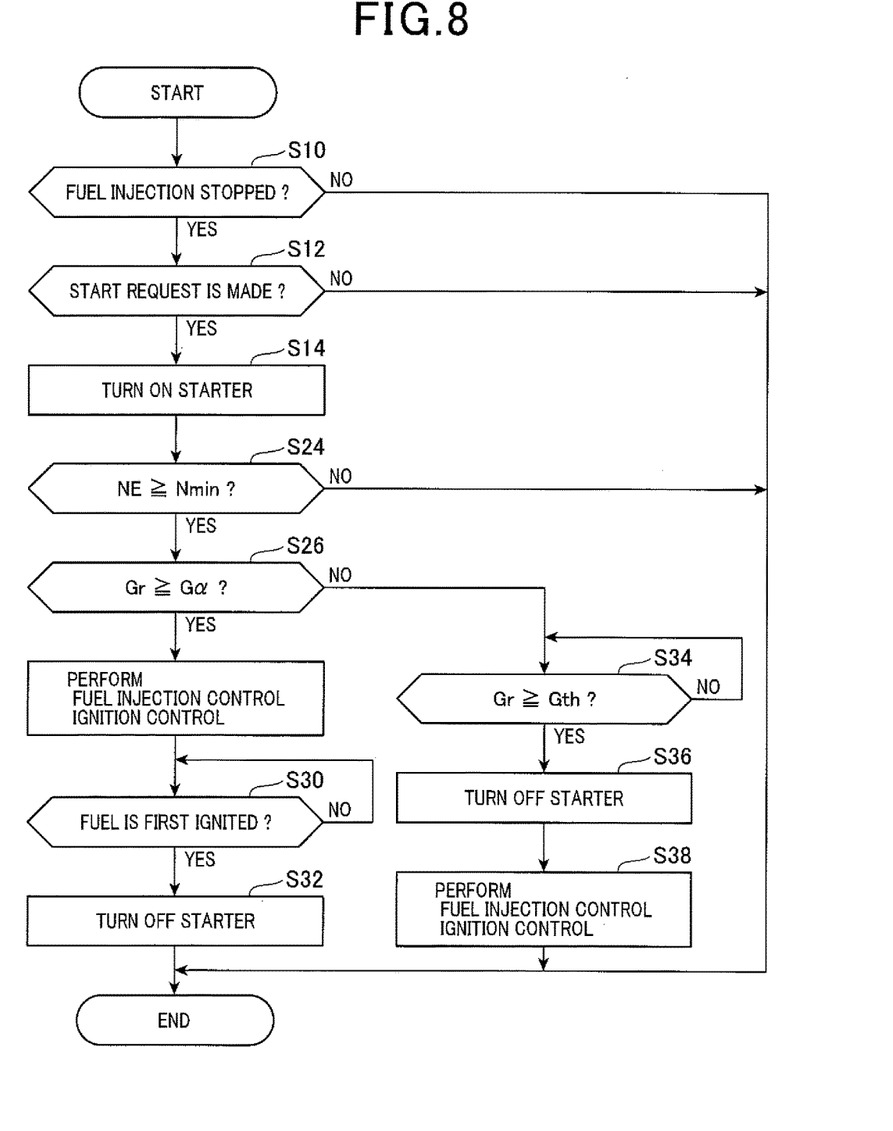
FIG. 8 is a flowchart of a sequence of logical steps in a start control program executed by an engine control apparatus in the third embodiment.

FIG. 8 is a flowchart of a sequence of logical steps in a start control program executed by the ECU 50 in the third embodiment. The same step numbers, as employed in FIG. 2, will refer to the same operations, and explanation thereof in detail will be omitted here.

After step S14 wherein the starter 30 is turned on, the routine proceeds to step S24 wherein it is determined whether the engine speed NE is higher than or equal to the intermediate speed Nmin, as already explained in the first embodiment. The ECU 50 works as a sub-determiner to execute the operation in step S24. The intermediate speed Nmin is also referred to as a set speed. If a YES answer is obtained in step S24, then the routine proceeds to step S26 wherein it is determined whether the air intake quantity Gr is greater than or equal to a given reference value Ga or not. This operation is to determine whether the amplitude of the pulsating component contained in the engine speed NE is greater than a preselected reference amplitude or not. The reference value Ga is set to a fixed value which is experimentally determined. For example, the reference value Ga is selected to be an intermediate value in a range wherein the quantity of intake air sucked into the engine 10 usually varies until the engine speed NE reaches the intermediate speed Nmin at the above described initial status.

If a YES answer is obtained in step S26, then the routine proceeds to step S28 wherein the ECU 50 performs fuel injection control and ignition control to spray the fuel through the fuel injectors 15 into the engine 10 and ignite the fuel through the spark plugs 22 in the engine 10. Subsequently, the routine proceeds to step S30 wherein it is decided whether the fuel has been fired for the first time in the engine 10. This determination may be made using the engine speed NE. If a YES answer is obtained meaning that the fuel has been ignited or fired for the first time, then the routine proceeds to step S32 wherein the motor drive relay 36 and the pinion drive relay 40 are turned off to terminate the cranking operation.

The deactivation of the starter 30 to stop the cranking operation after the fuel injection control and the ignition control are initiated to ignite the mixture in the engine 10 is to avoid misfire in the engine 10. Specifically, when the pulsating component contained in the speed of the engine 10 is great, it will cause the speed of the engine 10 immediately after the air intake quantity Gr reaches the threshold value Gth after start of the cranking operation to be lowered by the amplitude of the pulsating component. The termination of the cranking operation at a time when the air intake quantity Gr reaches the threshold value Gth may, therefore, result in a lack in the quantity of fuel sprayed into the engine 10, which leads to a misfire in the engine 10. In order to alleviate this problem, the ECU 50 of this embodiment executes the operations in steps S26 to 32 to terminate the cranking operation after the mixture has been ignited in the engine 10 when the pulsating component of the speed of the engine 10 is great.

Alternatively, if a NO answer is obtained in step S26 meaning that the air intake quantity Gr is smaller than the reference value Ga, then the routine proceeds to step S34 wherein it is determined whether the air intake quantity Gr has become greater than the threshold value Gth or not. This determination is to determine whether the cranking operation should be terminated or not. If a YES answer is obtained in step S34, then the routine proceeds to step S36 wherein the motor drive relay 36 and the pinion drive relay 40 are turned off to terminate the cranking operation. The routine then proceeds to step S38 wherein the ECU 50 performs the fuel injection control and the ignition control to spray the fuel through the fuel injectors 15 into the engine 10 and ignite the fuel through the spark plugs 22 in the engine 10.

The fact that the fuel injection control and the ignition control are commenced after the termination of the cranking operation if a NO answer is obtained in step S26 is to shorten the time for which the engine 10 is cranked. Specifically, when the amplitude of the pulsating component of the speed of the engine 10 is small, the quantity of fuel sprayed into the engine 10 is accurately calculated, thereby reducing the risk of misfire in the engine 10. When the starter 30 is deactivated during the cranking operation, the speed of the engine 10 will briefly continue to increase due to the inertia of the crankshaft 19. Therefore, when the amplitude of the pulsating component is small, it is possible to achieve initial firing of fuel in the engine 10 even when the cranking operation is terminated before the fuel is ignited. The cranking operation is, thus, stopped early, thereby shortening the time for which the starter 30 is activated to start the engine 10.

Figures 9A, 9B:
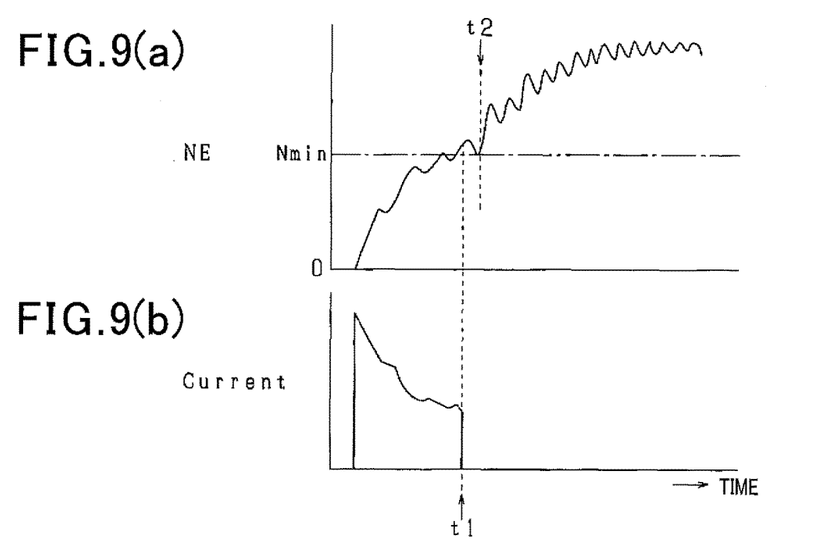
FIG. 9(a) demonstrates a transition in engine speed.
FIG. 9(b) demonstrates engine starting control when a pulsating component of the engine speed is small.
Figures 10A, 10B:
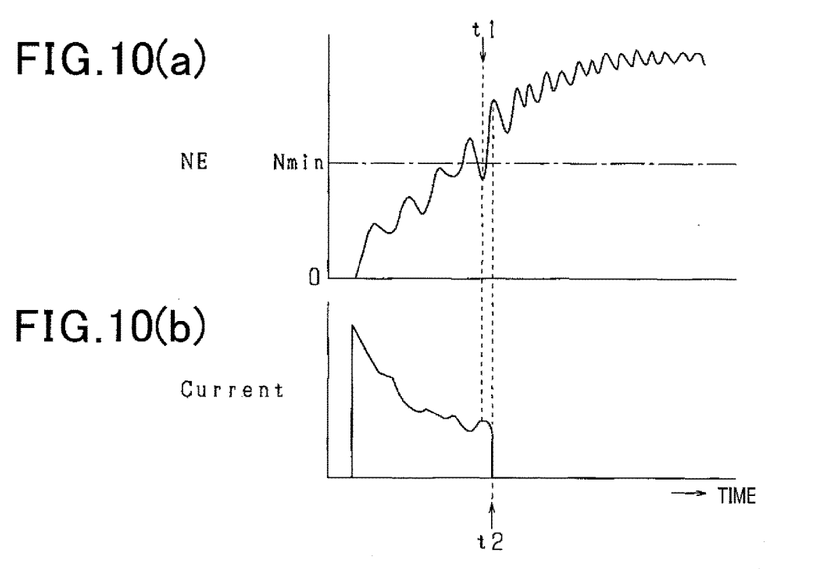
FIG. 10(a) demonstrates a transition in engine speed.
FIG. 10(b) demonstrates engine starting control when a pulsating component of the engine speed is great.

An example of a starting control operation executed by the ECU 50 of this embodiment to control starting of the engine 10 will be described below with reference to FIGS. 9(a) and 9(b) and FIGS. 10(a) and 10(b). FIGS. 9(a) and 10(a) demonstrate a transition in engine speed NE. FIGS. 9(b) and 10(b) demonstrate a transition in electrical current flowing through the motor 32. FIGS. 9(a) and 9(b) illustrate the case where the pulsating component contained in the speed of the engine 10 is smaller, while FIGS. 10(a) and 10(b) illustrate the case where the pulsating component contained in the speed of the engine 10 is greater than that in FIGS. 9(a) and 9(b).

The case where the pulsating component is smaller will first be described. In the example of FIGS. 9(a) and 9(b), before time t1 after start of the cranking operation, the air intake quantity Gr is determined to be smaller than the reference value Ga. Subsequently, at time t1, the air intake quantity Gr is determined to have reached the threshold value Gth, so that the cranking operation is terminated. The ECU 50 then starts the fuel injection control and the ignition control. At time t2, the initial firing of fuel occurs in the engine 10.

The case where the pulsating component is greater will first be described. In the example of FIGS. 10(a) and 10(b), after start of the cranking operation, the air intake quantity Gr is determined to be greater than or equal to the reference value Ga. Afterwards, the ECU 50 starts the fuel injection control and the ignition control. At time t1, the initial firing of fuel occurs in the engine 10. At time t2, the initial firing is determined to have been taken place, and the cranking operation is terminated.

The engine control apparatus of this embodiment is, as apparent from the above discussion, capable of eliminating the risk of misfire in the engine 10 at the start of the engine 10 when the pulsating component contained in the speed of the engine 10 is great.

Fourth Embodiment

Figure 11A:
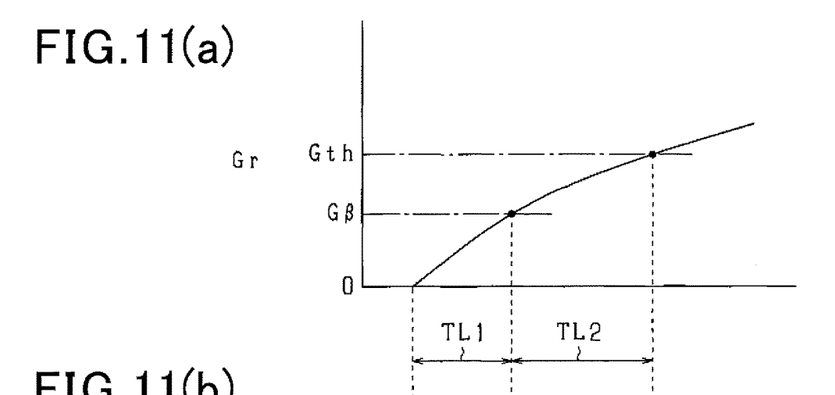
FIG. 11(a) demonstrates a transition in air intake quantity, as measured by an air flow meter in the fourth embodiment.
Figure 11B:
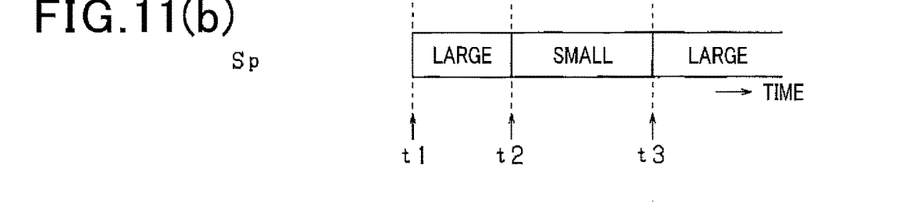
FIG. 11(b) demonstrates a transition in air intake quantity supplied to an engine in engine starting control in the fourth embodiment.

The fourth embodiment will be described below with respect to differences between itself and the first embodiment. The ECU 50 of this embodiment is designed to regulate the quantity of intake air delivered to the combustion chamber 10a of the engine 10 in a period of time between start and end of the cranking operation. How to regulate the quantity of intake air will be described below with reference to FIGS. 11(a) and 11(b). FIG. 11(a) demonstrates a transition in air intake quantity Gr, as measured by the air flow meter 12. FIG. 11(b) demonstrates a transition in air intake quantity Sp supplied to the combustion chamber 10a.

A period of time between time H when the starter 30 starts cranking the engine 10 and time t2 when the ECU 50 determines that the air intake quantity Gr has increased to be more than or equal to a given value Gβ that is smaller than the threshold value Gth is defined as a first time period TL1. A period of time between time t2 and time t3 when the ECU 50 determines that the air intake quantity Gr has reached the threshold value Gth is defined as a second time period TL2. The ECU 50 in this embodiment is designed to control the operations of the throttle valve 14 and the variable valve timing device 20 so as to have the quantity of intake air which is delivered to the combustion chamber 10a per unit time in the first period of time TL1 and greater than that in the second period of time TL2. Specifically, the ECU 50 controls the throttle valve 14 to have an open position in the second time period TL2 which is smaller than that in the first time period TL1. Additionally, the ECU 50 also controls the variable valve timing device 20 so that the intake valves 16 has an intake valve advance angle in the second time period TL2 which is smaller than that in the first time period TL1. In other words, the ECU 50 controls the operation of the variable valve timing device 20 to delay the time when the intake valves 16 are opened in the second time period TL2 to be later than that when the intake valves 16 are opened in the first time period TL1. The ECU 50 works as a switching determiner and an operating device.

After time t3, the ECU 50 controls the operations of the throttle valve 14 and the variable valve timing device 20 to have the quantity of intake air which is delivered to the combustion chamber 10a per unit time and greater than that delivered to the combustion chamber 10a per unit time in the second time period TL2.

The engine control apparatus of this embodiment is also capable of reducing the noise occurring between the ring gear 23 and the pinion gear 31 and ensures the stability in quickly starting the engine 10. The noise arising from the pulsating component contained in the speed of the engine 10 becomes great with an increase in speed of the engine 10. In the first half of the time the engine 10 is started, the speed of the engine 10 is usually low, so that when the quantity of intake air supplied to the combustion chamber 10a is increased in order to quickly start the engine 10, the above noise is not undesirably high. In contrast, in the second half of the time the engine 10 is started, the speed of the engine 10 is high. It is, thus, preferable to decrease the quantity of intake air delivered to the combustion chamber 10a in order to reduce the noise. Based on this fact, the ECU 50 of this embodiment decreases the quantity of intake air supplied to the combustion chamber 10a in the second time period TL2 to be smaller than that in the first time period TL1.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

In step S18 of FIG. 2 in the first embodiment, the ECU 50 may turn off only one of the motor drive relay 36 and the pinion drive relay 40 to terminate the cranking operation.

In the third and fourth embodiments, the ECU 50 may alternatively use the amplitude ΔN of the pulsating component of the speed of the engine 10 to determine the cranking terminating time instead of the air intake quantity Gr.

How to decrease the speed of the engine 10 on the termination of the cranking operation with an increase in quantity of intake air is not limited to the one exemplified in the first embodiment. For instance, the speed of the engine 10 on the termination of the cranking operation may be decreased with an increase in rate at which the air intake quantity Gr is increased at the start of the cranking operation or an amount of increase in the air intake quantity Gr at the start of the cranking operation.

How to regulate the quantity of intake air supplied to the combustion chamber 10a during the cranking operation is not limited to the one described in the fourth embodiment. For instance, the ECU 50 may regulate at least one of the open position of the throttle actuator 13 and the opening or closing timing of the intake valves 16 to bring the amplitude ΔN of the pulsating component of the speed of the engine 10, as calculated as a function of the engine speed NE, into agreement with a target value. The target value may be experimentally derived and fixed.

The engine 10 is, as described above, a spark-ignited engine, but may alternatively be implemented by a compression-ignited engine such as a diesel engine. In this case, when the quantity of intake air delivered to the combustion chamber 10a of the engine 10 is used as a parameter correlating with the pulsating component of the speed of the engine 10, the quantity of intake air may include EGR gas in addition to fresh air.

What is claimed is:

1. An engine control apparatus for use with a system equipped with an engine and an engine starter, the engine starter including: (i) an electrical motor which is electrically energized to produce torque, (ii) a pinion gear to which the torque, as produced by the electrical motor, is transmitted, and (iii) a pinion shifter which thrusts the pinion gear to a location where the pinion gear is engageable with a ring gear coupled with a crankshaft of the engine, the engine control apparatus comprising:
an electronic control unit configured to:
determine a pulsation parameter that represents one of: a rotational speed of the engine, and a quantity of intake air delivered to a combustion chamber of the engine;
control the pinion shifter to move the pinion gear into engagement with the ring gear and then rotate the electrical motor to crank the engine; and
determine and set a cranking terminating time of the engine starter based on the pulsation parameter, the cranking terminating time of the engine starter being when cranking of the engine starter is terminated.

2. The engine control apparatus as set forth in claim 1, wherein the pulsation parameter is a pulsating component of the rotational speed of the engine.

3. The engine control apparatus as set forth in claim 1, wherein:
the pulsation parameter is the quantity of intake air delivered to the combustion chamber of the engine; and
the electronic control unit is configured to: (i) increase the rotational speed of the engine at which the cranking operation is terminated by decreasing the quantity of intake air, and (ii) decrease the rotational speed of the engine at which the cranking operation is terminated by increasing the quantity of intake air.

4. The engine control apparatus as set forth in claim 1, wherein the system includes:
an intake passage connected to the combustion chamber of the engine;
an air intake quantity regulator configured to regulate the quantity of intake air delivered to the combustion chamber through the intake passage; and
an operating device that controls the air intake quantity regulator to regulate the quantity of intake air during the cranking operation.

5. The engine control apparatus as set forth in claim 4, wherein:
the electronic control unit is configured to:
determine whether, after start of the cranking operation, the pulsation parameter increases to be greater than or equal to a predetermined threshold value;
in response to determining that the pulsation parameter is greater than or equal to the predetermined threshold value, terminate the cranking operation; and
determine whether the pulsation parameter is greater than or equal to a predetermined value, which is smaller than the predetermined threshold value; and
the operating device controls the air intake quantity regulator to regulate the quantity of intake air which is delivered into the combustion chamber in a period of time from start of the cranking operation until the electronic control unit determines that the pulsation parameter is greater than or equal to the predetermined value, the quantity of air being a value greater than a value of the quantity of intake air which is delivered into the combustion chamber in a period of time from when the electronic control unit determines that the pulsation parameter is greater than or equal to the predetermined value until the electronic control unit determines that the pulsation parameter is greater than or equal to the predetermined threshold value.

6. The engine control apparatus as set forth in claim 4, wherein the air intake quantity regulator includes at least one of: a throttle valve device disposed in the intake passage, and a variable valve timing device that changes a valve timing of an intake valve disposed in the engine.

7. The engine control apparatus as set forth in claim 1, wherein the electronic control unit is configured to:
determine whether the pulsation parameter is greater than or equal to a reference value after start of the cranking operation;
in response to determining that the pulsation parameter is greater than or equal to the reference value, terminate the cranking operation after an air-fuel mixture is ignited in the combustion chamber of the engine; and
in response to determining that the pulsation parameter is smaller than the reference value, terminate the cranking operation before the air-fuel mixture is ignited in the combustion chamber of the engine.

8. The engine control apparatus as set forth in claim 1, wherein:
the engine starter is designed so that a period of time from when the engine starter starts cranking the engine until the rotational speed of the engine reaches a predetermined speed is less than or equal to a predetermined value, the predetermined speed being lower than an idling speed of the engine; and the electronic control unit is configured to:
  determine whether, after start of the cranking operation, the pulsation parameter increases to be greater than or equal to a predetermined threshold value; and
  in response to determining that the pulsation parameter is greater than or equal to the predetermined threshold value, terminate the cranking operation, the predetermined threshold value being set to a minimum value of a range where the pulsation parameter is permitted to change during the period of time after the engine starter starts cranking the engine.

* * * * *